(12) United States Patent
Tanase

(10) Patent No.: US 9,030,790 B1
(45) Date of Patent: May 12, 2015

(54) LOW-LEAKAGE ESD PROTECTION CIRCUIT

(71) Applicant: Maxim Integrated Products, Inc., San Jose, CA (US)

(72) Inventor: Gabriel E. Tanase, Cupertino, CA (US)

(73) Assignee: Maxim Integrated Products Inc., San Jose, CA (US)

( * ) Notice: Subject to any disclaimer, the term of this patent is extended or adjusted under 35 U.S.C. 154(b) by 20 days.

(21) Appl. No.: 13/730,645

(22) Filed: Dec. 28, 2012

(51) Int. Cl.
*H02H 3/22* (2006.01)
*H02H 9/04* (2006.01)

(52) U.S. Cl.
CPC ........................................ *H02H 9/04* (2013.01)

(58) Field of Classification Search
USPC ..................................................... 361/56, 111
See application file for complete search history.

(56) References Cited

U.S. PATENT DOCUMENTS

| | | | |
|---|---|---|---|
| 7,072,161 B2* | 7/2006 | Chen | 361/91.1 |
| 2010/0142107 A1* | 6/2010 | Ker et al. | 361/56 |
| 2010/0277842 A1* | 11/2010 | Chuang | 361/57 |

* cited by examiner

*Primary Examiner* — Danny Nguyen
(74) *Attorney, Agent, or Firm* — TIPS Group

(57) ABSTRACT

An electrostatic discharge (ESD) protection circuit, set forth by way of example and not limitation, includes an input operative to receive input signals and a primary protection circuit coupled to the input. The protection circuit is operative to provide a single ESD current path for one or more the input signals that are ESD strikes. The currents of positive ESD strikes and negative ESD strikes flow through the single ESD current path, where the single ESD current path is not used by one or more of the input signals that are non-ESD signals.

20 Claims, 2 Drawing Sheets

LOW-LEAKAGE ESD PROTECTION CIRCUIT

BACKGROUND

Electrostatic discharge (ESD) events may occur as a result of a discharge of static electricity or electrostatic induction, typically from human or machine contact. Electronic devices and circuits can be harmed by the sudden current and voltage spikes caused by ESD, and ESD protection circuits have been developed to protect circuits against this potential damage.

Many standard ESD protection circuits use reverse-biased diodes connected in series. For example, two diodes may have common terminals connected to the input to a circuit and their other terminals connected to the supply rails. In normal operation the diodes are reverse-biased and act as an open circuit. When an ESD strike occurs with a high voltage at the input, one diode becomes forward biased and the ESD current can be directed to a connected core-clamp that limits the voltage of the strike and directs the current to ground, thus protecting the connected circuitry from the strike.

However, the non-ideal diodes contribute leakage current in the reverse-biased configuration. This leakage current can become large in many implementations and is undesirable, especially for devices using signals having a limited current range and/or having a limited supply of power. Minimizing such leakage current can become a major concern in the design of ESD protection circuits. The leakage current at the input can be the difference between the leakage currents of the two diodes, and these diodes may exhibit different leakage currents despite being of the same type, especially at higher temperatures. Furthermore, the leakage current may be proportional to the voltages across the diodes, such that leakage current can be a function of the input common-mode voltage. In addition, noise current may be of even more concern in some applications and is determined by the leakage current flowing through the diodes. Such current noise is additive, such that each diode contributes additional noise current to the input signal even in protection circuits that have biased the diode voltages to follow the input voltage.

These and other limitations of the prior art will become apparent to those of skill in the art upon a reading of the following descriptions and a study of the several figures of the drawing.

SUMMARY

An electrostatic discharge (ESD) protection circuit, set forth by way of example and not limitation, includes an input operative to receive input signals and a primary protection circuit coupled to the input. The protection circuit is operative to provide a single ESD current path for one or more the input signals that are ESD strikes. The currents of positive ESD strikes and negative ESD strikes Bow through the single ESD current path, where the single ESD current path is not used by one or more of the input signals that are non-ESD signals.

In various implementations, the primary protection circuit can include at least one transistor on the single ESD current path, such as a MOSFET transistor, for example. The at least one transistor can be used as a body diode if the ESD strike is a positive strike and turned on as a conducting transistor if the ESD strike is a negative strike. The gate of the at least one transistor can be capacitively coupled to the input. In some implementations, the gate of the transistor can be biased above a voltage at a source or a drain of the transistor by a voltage about double the semiconductor Fermi voltage level of the transistor to reduce the leakage current of the transistor. Multiple transistors can be included in the single ESD current path of the primary protection circuit, where the transistors can act as diodes for the ESD strikes having one or more positive voltages and can be turned on as a conducting transistor for the ESD strikes having one or more negative voltages. The primary protection circuit can be coupled to an upper supply rail and the circuit can include a core-clamp coupled to the upper supply rail and operative to limit the voltage of the ESD strikes that have one or more positive voltages. The primary protection circuit can produce a leakage current at the input, and can use at least one bootstrapping amplifier to provide a reduced voltage across the transistor and to reduce input current dependency of the leakage current on an input voltage at the input.

In various implementations, a secondary protection circuit can be coupled to the primary protection circuit, coupled to the input, and coupled to a lower supply rail to provide a second ESD current path for the input ESD strikes having one or more negative voltages. A leakage current of the secondary protection circuit can be less than a leakage current of the primary protection circuit. The secondary protection circuit can be coupled to the primary protection circuit by a resistor and can include at least one diode on the second ESD current path.

An electrostatic discharge (ESD) protection circuit, set forth by way of example and not limitation, includes an input operative to receive input signals and a transistor coupled to the input. The transistor is operative to provide an ESD current path for the received input signals that are ESD strikes, where a gate of the transistor is biased above a voltage at a source or a drain of the transistor by a voltage about double the semiconductor Fermi voltage level of the transistor.

In various implementations, a second transistor can be included in the ESD current path and coupled between the first transistor and an upper supply rail. The gates of the first and second transistors can be capacitively coupled to the input. A core-clamp can be coupled to the upper supply rail. The first and second transistors and the core-clamp can be included in the ESD current path. Currents of the ESD strikes can flow through the ESD current path for the ESD strikes that have one or more positive voltages and for the ESD strikes that have one or more negative voltages, where the single ESD current path is not used by the input signals that are non-ESD signals. In some implementations, a secondary protection circuit can he coupled to the primary protection circuit, coupled to the input, and coupled to a lower supply rail. The secondary protection circuit can include at least a zener diode and is operative to provide a second ESD current path for the ESD strikes that have one or more negative voltages. A leakage current of the secondary protection circuit can be less than leakage current of the primary protection circuit. Some implementations can include a first amplifier connected between the input and a source of the transistor to provide a voltage to the source about equal to an input voltage of the input. A second amplifier can be connected between the input and a gate of the transistor to provide a voltage to the gate above the input voltage by an amount about double the semiconductor Fermi voltage level of the transistor.

An electrostatic discharge (ESD) protection circuit, set forth by way of example and not limitation, includes an input operative to receive input signals, a core-clamp connected to an upper supply rail, and a primary protection circuit coupled to the input. The primary protection circuit is operative to provide a first ESD current path for one or more of the input signals that are ESD strikes, where the first ESD current path includes a first transistor capacitively coupled to the input, a second transistor capacitively coupled to the input and connected between the first transistor and the upper supply rail, and the core-clamp. The currents of the ESD strikes flow through the first ESD current path for the ESD strikes that have one or more positive voltages and for the ESD strikes that have one or more negative voltages, where first ESD current path is not used by one or more of the input signals that are non-ESD signals. A secondary protection circuit is coupled to the primary protection circuit, coupled to the input, and coupled to a lower supply rail, and provides a second ESD current path for the input ESD strikes having one or more negative voltages. In some implementations, the first transistor can be a P-channel MOSFET including a source that is bootstrapped to a voltage about equal to a voltage of the input, and a gate that is bootstrapped to a voltage that is above the voltage of the input by an amount about double the semiconductor Fermi voltage level of the first transistor.

These and other combinations and advantages and other features disclosed herein will become apparent to those of skill in the art upon a reading of the following descriptions and a study of the several figures of the drawing.

BRIEF DESCRIPTION OF THE DRAWINGS

Several examples will now be described with reference to the drawings, wherein like components are provided with like reference numerals. The examples are intended for the purpose of illustration and not limitation. The drawings include the following figures.

DETAILED DESCRIPTION OF EXAMPLE IMPLEMENTATIONS

Figure 1:
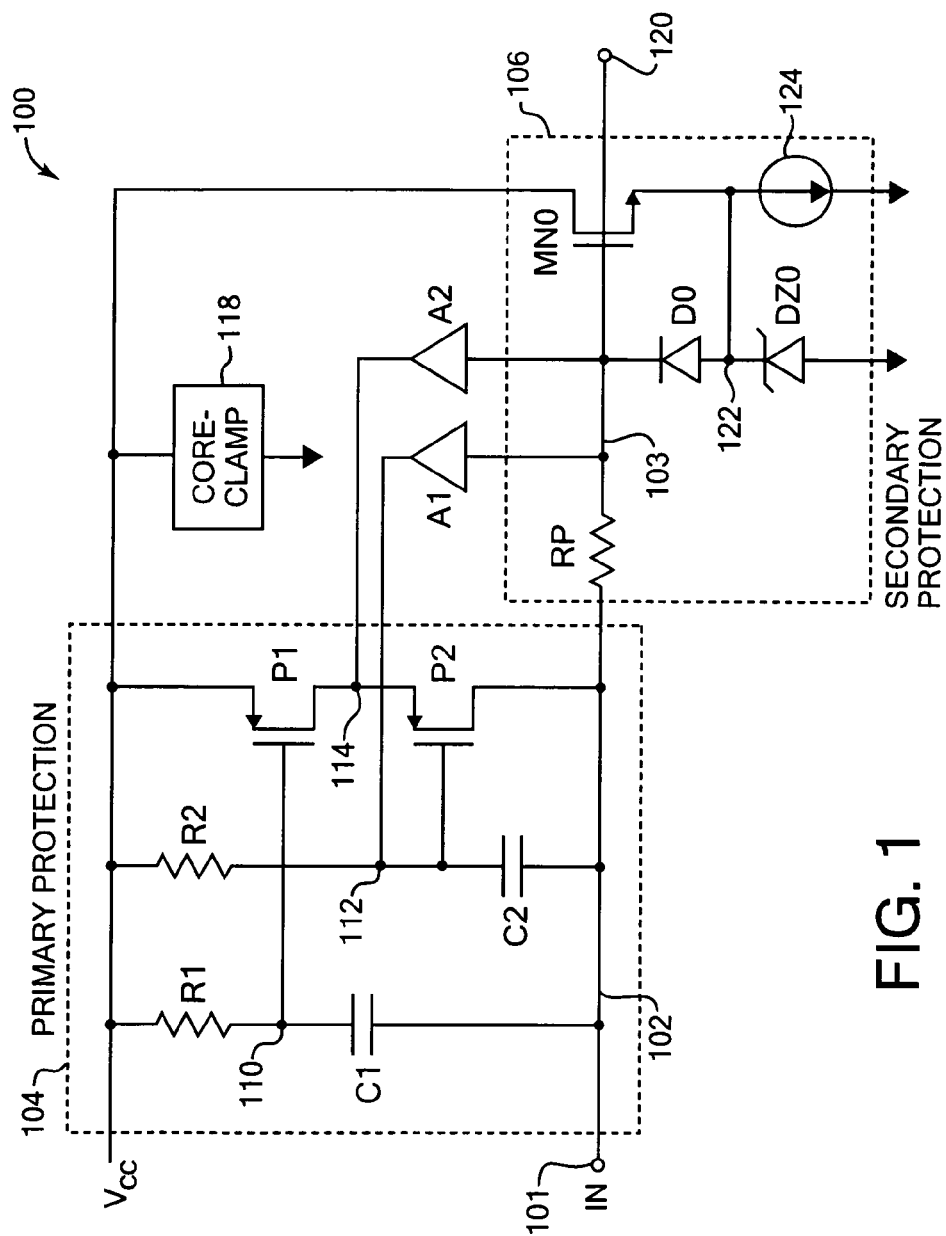
FIG. 1 is a schematic diagram of an example ESD protection circuit suitable for use with one or more features and implementations described herein.

In the following descriptions, components will he discussed with reference to specific examples such as particular frequency ranges, particular communication Standards, etc. These examples are not to be seen as limiting but, rather, illustrative of the general concepts set forth herein.

Implementations described herein provide features allowing the reduction of leakage current and current noise in ESD protection circuits. Prior implementations provide ESD protection but at the cost of increased leakage current and current noise. For example, one prior implementation provides diodes having common terminals connected to an input and the other terminals connected to the supply rails. In normal operation the diodes are reverse-biased. When an ESD pulse or strike occurs With a positive voltage al the input, the upper diode of an upper ESD current path becomes forward biased and the ESD current may be directed to a core-clamp that limits the voltage of the strike and directs the current to ground. A negative ESD strike has current that flows through a second, lower ESD path from ground, through the lower diode, and to the input. The leakage current at the input can he the difference between the leakage currents of the two diodes and can be a function of the input common-mode voltage. The non-ideal diodes still contribute leakage current in the reverse-biased configuration despite being of the same type, due to inherent differences in devices. In addition, noise current is determined by the leakage current Mowing through the diodes and is additive, such that the diode on each ESD path contributes additional noise current that degrades the input signal.

Other prior circuits may connect two diodes in series between the input and the upper supply rail, and two diodes connected in series between the input and the lower supply rail. A follower buffer may be connected between the input and the node between the two upper diodes, and similarly a follower buffer may conned input and the node between the two lower diodes. This causes the voltage across each of the two diodes connected to the input to be close to zero and thus reduces the leakage current. However, the follower amplifiers do not copy the input voltage precisely, such that the diodes have a bias and a leakage current. This leakage current varies with the input voltage due to non-ideal behavior of the follower buffers, causing a difference in leakage currents between the upper and lower paths and increasing the overall leakage current. Furthermore, this configuration may suffer from high current noise, since it provides two different ESD Current paths and the diode connected to the input line on each path contributes additional noise.

Features described herein allow both input leakage current and input current noise to be reduced significantly compared to prior circuits. For example, a protection circuit can include a primary protection block that includes one ESD current path to a supply rail, where currents of both positive and negative ESD strikes flow through that ESD current path. With one current path, the primary protection block thus has one device that provides leakage current. Since there are less paths and less leakage current, there is also significantly less current noise contributed by the protection circuit during normal operation.

Further, in some implementations, one of the transistors is an input-connected transistor that contributes significantly less leakage current due to functioning in a low-leakage operation region identified herein, in which its gate-to-source or gate-to-drain voltage being biased to approximately double the semiconductor Fermi voltage level of the transistor. In some implementations one or more transistors can be used that have a gate terminal capacitively coupled to the input. Some implementations of the protection circuit can include a secondary protection block that contributes significantly less leakage current than the primary protection block and therefore does not significantly contribute to leakage current and current noise of the protection circuit.

FIG. 1 is a block diagram of an example ESD protection circuit 100 suitable for use with one or more features and implementations described herein. Protection circuit 100 can in some implementations be connected to the input of a circuit receiving an input signal. The circuit may be susceptible to ESD and is to be protected by the protection circuit 100. The protection circuit 100 can be used in applications in which current noise and/or leakage current is of importance.

In some examples, the protection circuit 100 can be used at inputs to circuits and devices that use or make use of very small amounts of current, such as current in the femtoamp range, For example, such applications may measure currents or voltages at very low levels. In some non-limiting examples, a circuit 100 can be coupled each input to an op-amp or amplifier used in an electronic device, such as a portable device (computer, laptop, cell phone, tablet, etc) or other device. In one example application, femtoamp input current op amps can be connected to the protection circuit 100. In a non-limiting example, the output of the protection circuit 100 can be connected to a gate of one transistor of a different pair of transistors, where another protection circuit can be coupled to the gate of the other transistor of the pair. For example, some op amp devices such as the MAX9636 and similar devices from Maxim Integrated Products, Inc. of San Jose, Calif., feature wide bandwidth at low quiescent current, are suitable for a range of battery-powered applications, and have a low-power shutdown mode. Such devices may be susceptible to high leakage current which can increase power consumption and reduce battery life, and operate with low-amplitude currents and so are susceptible to current noise. One or more features described herein can be used in such applications to obtain lower leakage currents, lower current noise, and reduced power consumption.

Protection circuit 100 receives input signals on an input signal line 102 to be protected from ESD. In the example implementation of FIG. 1, protection circuit 100 includes a primary protection block 104 and a secondary protection block 106.

The primary protection block 104 is connected to the input line 102. This block 104 can shunt ESD current away from the connected circuit at terminal 120 during an ESD strike. The primary protection block 104 includes a capacitor C1 coupled to the input line 102, and a resistor R1 coupled between the capacitor C1 (at node 110) and the upper supply rail (Vcc in FIG. 1). A capacitor C2 is similarly coupled to the input line 102, and a resistor 112 is coupled between the capacitor C2 (at node 112) and the Vcc supply. The capacitors C1 and C2 provide alternating current (AC) coupling to the gates of the transistors P1 and P2. In one non-limiting example of the circuit of FIG. 1, resistors R1 and R2 can be 340 kilo-ohms and capacitors C1 and C2 can be 0.25 pF. Other component values can be used in other implementations.

Transistor devices P1 and P2 are also included in the primary protection block 104. A transistor P2 is connected to the input line 102 at its drain and to a node 114 at its source. A transistor P1 is connected by its drain to node 114 and to the Vcc supply at its source. The gate of transistor P2 is connected to node 112 and the gate of transistor P1 is connected to node 110. In some implementations, the transistors P1 and P2 are MOSFET devices that each have a body connection that is connected to their sources (see FIG. 2, below) to cause parasitic body diodes included in the transistors to conduct when the transistors are off, allowing transistors P1 and P2 to act as diodes under appropriate conditions. For example, in some implementations, transistors P1 and P2 can be PMOS transistors having body diodes having a drain connected to body, where the drain is p-type and the body is n-type, creating a PN diode with a cathode connected closer to the Vcc upper supply rail and an anode connected closer to the input line 102.

In some implementations, a core-clamp 118 can be connected between Vcc and ground. Core-clamp 118 can act similarly to a zener diode and function as a voltage limiter for voltage seen at the core-clamp 118 and for current flowing to ground. This function allows the core-clamp 118 to limit the voltage seen at Vcc. In some implementations, in response to an ESD positive strike, the core-clamp 118 limits the voltage in the strike to a value that is higher than the maximum supply voltage supplied as Vcc. This allows the core-clamp 118 to limit the voltage of ESD strikes and not limit normal Vcc voltages, e.g., core-clamp 118 is off for normal operation when there is no ESD strike on the input line 102.

The secondary protection block 106 is connected to the input line 102 to additionally protect the circuit connected to terminal 120. A resistor RP can be included in the secondary protection block 106 in some implementations and is connected in series with the input line 102. The resistor RP can provide isolation between the primary protection block 104 and the secondary protection block 106, where the resistor reduces the current and voltage in the secondary protection block 106 in an ESD strike. For example, in some implementations, the larger the RP resistance value, the less the current through the diodes D0 and DZ0, allowing these diodes to be smaller and the leakage current and current noise to be smaller. However, the larger the size of the resistor RP, the greater a noise component will be contributed by the resistor to the signal at the node 103 of the input line 102. Thus, a resistance value can be selected that is appropriate to these considerations for a particular implementation. In one non-limiting example, RP can have a resistance of 550 ohms.

Diode D0 is connected by its cathode to the node 103 of the input line 102 and to a node 122 by its anode. A zener diode DZ0 is connected by its cathode to the node 122 and to the lower supply rail by its anode. In this implementation, the lower supply rail is ground, but can be other voltages in other implementations. The zener diode DZ0 can function similarly to the core-clamp 118 to limit the voltage across its terminals and at node 122. For example, the zener diode DZ0 can have a voltage limit rating higher than the maximum voltage level seen at the diode DZ0 during normal operation, such that normal signal voltages are not affected by the limiting operation.

Transistor MN0 is connected at its gate to the node 103 and is connected to the high supply rail Vcc at its drain. The source of the transistor MN0 is connected to node 122 between the diodes D0 and DZ0. The transistor MN0 is an N-channel MOSFET in the example implementation of FIG. 1. Transistor MN0 provides a constant Vgs. A current source 124 is connected between the node 122 and the lower supply rail (e.g., ground) and provides well-regulated current for the transistor MN0. Fn some implementations, the current source 124 can provide current that is higher than the leakage current at node 122. The MN0 transistor's gate-source voltage and the zener diode voltage can act to provide a voltage regulator at the node 103, such that current flowing through the resistor RP and the voltage at node 103 is limited by the MN0 gate-source voltage and the zener diode voltage.

A pair of follower amplifiers or buffers A1 and A2 are connected between the secondary protection block 106 and the primary protection block 104. Amplifier A1 is connected between the node 103 of the input line 102 and the node 112 of the primary protection block 104. In some implementations, amplifier A1 can provide a voltage level to the node 112 of about the input voltage at node 103 plus about two times the semiconductor Fermi voltage level of the transistor P2, as described in greater detail below. Amplifier A2 is connected between the node 103 and the node 114 of the primary protection block 104 and can provide a voltage level to the node 114 that is slightly above the input voltage at node 103. The amplifiers provide voltage biasing that can reduce the amount of leakage current from the transistor P2.

The node 103 is at the output of the ESD protection circuit 100, which is connected to an input terminal 120 connected to the protected circuit.

One or more of the components of protection circuit 100 may function in different ways depending on the signal on the input line. Three general operating conditions are described below: normal operation without an ESD strike on the input line 102, operation in response to a positive ESD strike on the input line 102, and operation in response to a negative strike on the input line 102.

The circuit functions in normal operation when non-ESD signals (or no signals) are provided on the input line 102, and are significantly lower voltage than ESD strikes. In normal operation, current flows from the input port 101 through the input line 102, through the resistor RP, and to the output terminal 120. Resistors R1 and R2 in the primary protection block 104 act as pull-up resistors that keep the P2 and P1 transistors turned off. Since the body diodes of the transistors P1 and P2 are reverse-biased, these diodes do not conduct.

The gates of P1 and P2 are isolated from the input line 102 by the capacitors C1 and C2. Leakage current of the primary protection block 104 is contributed by the body diode of transistor P2 and transistor P2. The leakage from the body diode is independent of the gate-to-source voltage, while leakage from the transistor P2 depends on this voltage. In addition, both leakage components depend on the source-to-drain voltage of the P2 device.

Transistor P2 is bootstrapped with the input voltage at node 114 as provided by follower amplifier A2, and so the source-to-drain voltage Vsd across transistor P2 is zero or very small and remains approximately constant regardless of the input voltage. Therefore, little current can How, and the leakage current is small. In one non-limiting example, the Vsd of transistor P2 can be about 50 mV.

In addition, in some implementations, one of the features of protection circuit 100 for providing less leakage current is to set the gate of the transistor P2 to a voltage that is higher than the source or the drain of the transistor P2 and causing the transistor P2 to operate in a low-leakage region. Thus the leakage of the P2 device can be controlled by the gate to source voltage (Vgs) or the gate to drain voltage (Vgd). In some implementations, the gate of P2 is set higher than the source or drain of P2 by a voltage of about twice the semiconductor Fermi voltage level of the transistor P2. In some examples, if the Fermi level is about 0.2 to 0.4 volts, the Vgs or Vgd of transistor P2 can be set at about 0.4 to 0.8 volts. This causes the leakage current transistor P2 to he significantly reduced in comparison to not providing this bias.

The follower amplifier A1 provides a voltage to the gale of transistor P2. To provide twice the Fermi voltage level as described above, the amplifier A1 can provide the input line 102 voltage at the gate, and also act as a voltage shifter to shift this input voltage higher by the amount of about twice the Fermi voltage level of the transistor P2. This causes the gate-to-drain voltage of transistor P2 to beat about twice the Fermi voltage level and significantly reduces the leakage current. Follower amplifier A2 can act as a buffer to provide the input voltage to node 114. In some implementations, the amplifier A2 can also provide a voltage shift to its output by a small amount above the voltage of the input signal, which can help ensure that the output of amplifier A2 and the node 114 is always above the input voltage level despite variations of the amplifier A2 output.

Leakage current from the secondary protection block during normal operation is contributed from the lesser leakage current of the diode D0. The MN0 transistor is turned on and acts like a buffer and provides the input voltage at node 103 to the diode D0 at node 122. Due to the bootstrapping of diode D0, if there is any leakage current through the zener diode D0Z, it will flow through transistor MN0. Thus any leakage pail is set by diode D0. The bootstrapping causes the voltage difference across diode D0 to be small for any voltage of the input signal on input line 102 al node 103, e.g., the leakage current contributed by diode D0 is approximately input voltage independent. Overall, the leakage current contributed by the primary protection block 104 is much larger than the leakage current from the secondary protection block 106. in one non-limiting example, the leakage current from the primary protection block 104 may be about five times as large as the leakage current from the secondary protection block 106.

Input noise current contributed by protection circuit 100 is also small since the leakage current from the primary protection block 104 is only contributed by one path having the transistor P2, and even less leakage current is contributed by the diode D0 due to less current flowing in the secondary protection block 106. Since the input current noise is dependent on the leakage current, the small amount of leakage current leads to a small amount of current noise.

In a positive ESD strike, the input signal may go to a very high positive voltage level with a leading positive edge. In some examples, an ESD pulse can he in the range of 2 kV. In the primary protection block 104, the positive voltage signal edge conducts through the capacitors C1 and C2 and pulls up the gates of the transistors P2 and P1, turning them off (e.g., the transistors are P-channel). In addition, the gates of the transistors P1 and P2 are connected to the upper supply rail by resistors R1 and R2, and this connection discharges any voltage provided by the capacitors, keeping the transistors turned off. In a positive strike, the drain voltage of transistor P2 is pulled up above the body voltage, and the drain-to-body diode in transistors P2 conducts through the body connection (which is connected to the source), even though the transistor is off. Similarly, transistor P1 includes a both diode that conducts the current to the upper supply rail Vcc. Thus, the current path of a positive strike is through the body diode of transistor P2, through the body diode of transistor P1, and then through the core-clamp 118 which conducts the current to ground. The core-clamp 118 limits the voltage of the positive strike. The small capacitance of each device P1 and P2 between each gate and the upper supply rail, along with the corresponding capacitor C1 or C2, creates a voltage divider that reduces the voltage seen at each gate of transistors P1 and P2.

The secondary protection block 106 receives its most significant amount of current from the current that has flowed through the transistors P2 and P1 to the upper supply line Vcc. Some current flows into the core-clamp 118 and some current flows down from Vcc to the drain of transistor MN0, to the source of transistor MN0, to the zener diode DZ0 in breakdown, and to the lower supply rail at ground, Some current also can How through resistor RP from the input. Resistor RP sees an instantaneous current for a very short period of time because of capacitance between gale and source of transistor MN0, which is the time when current is flowing through the gate of transistor MN0. Thus resistor RP and the gate of transistor MN0 do not conduct a significant amount of current during a positive strike. This current would also How through the diode DZ0 to ground. The voltage at the MN0 transistor gate is a regulated voltage set by the gate-source voltage (Vgs) of the transistor and the breakdown voltage of the zener diode DZ0. The current through RP is determined by the input voltage and this gate voltage.

In a negative ESD strike, the input signal goes to a very high-magnitude negative voltage level with a negative leading edge. With respect to the primary protection block 104, the ESD current flows from ground, through the body diode of the core-clamp 118, and to the upper rail supply Vcc, where it flows to the primary protection block 104. Since the voltage at Vcc is higher than the voltage at the input line 102, the negative edge of the ESD pulse is transmitted to the gates of transistors P1 and P2, which pulls the voltage of these gates down and turns on these P-channel devices. With transistors P1 and P2 on, the ESD current conducts through transistors P1 and P2 to the input line 102 and out the input port 101. providing ESD discharge protection for the circuit at the terminal 120. The body diodes of the transistors P1 and P2 are turned off during the negative strike. The voltage at the input will go to a negative level that is set by the size of the transistors P1 and P2 which sets the resistance between Vcc and the input line 102. The resistances of transistors P1 and P2 provide a voltage divider along with the resistance at the input port 101, which sets the voltage of the ESD strike at the input.

With respect to the secondary protection block 106 during a negative strike, current flows from ground, through the diodes DZ0 and D0, through the resistor RP, and out to the input port 101 on input line 102. Thus the secondary protection block 106 provides additional current discharge and voltage reduction capability in the case of a negative strike, further protecting the circuit connected at terminal 102 in the implementations in which the resistances of transistors P1 and P2 is not high enough to sufficiently reduce the voltage at the input line 102 and terminal 120.

Secondary protection block 106 can be used in some implementations to allow the transistors P1 and P2 to be a smaller size. An advantage to having the transistors P1 and P2 be a small size is that the leakage current provided by the transistors P1 and P2 during normal operation is smaller if the transistors P1 and P2 are smaller in size. However, smaller P1 and P2 transistors may not allow the full protection to the circuit at terminal 102 for a negative strike, since the smaller transistors have a lower resistance and will cause the voltage at the input 101 and the terminal 120 to be larger, which may exceed the maximum voltage allowed by the protected circuit connected to terminal 120. Therefore, secondary protection block 106 can be used to provide additional negative strike protection and reduce the voltage at the terminal 120, allowing transistors P1 and P2 to be small in size. The devices in the secondary protection block 106 can be small in size and provide small leakage current and current noise, since the current flowing in secondary block 106 is small.

In other implementations, higher leakage current may be allowable and/or may not be an issue, and the transistors P1 and P2 can be increased in size to provide additional resistance and less voltage at the input line 102 and terminal 120. In some implementations, the secondary protection block 106 may not be needed in the ESD protection circuit 100 if the transistors P1 and P2 have enough resistance to provide Sufficient protection to the terminal 120.

Figure 2:
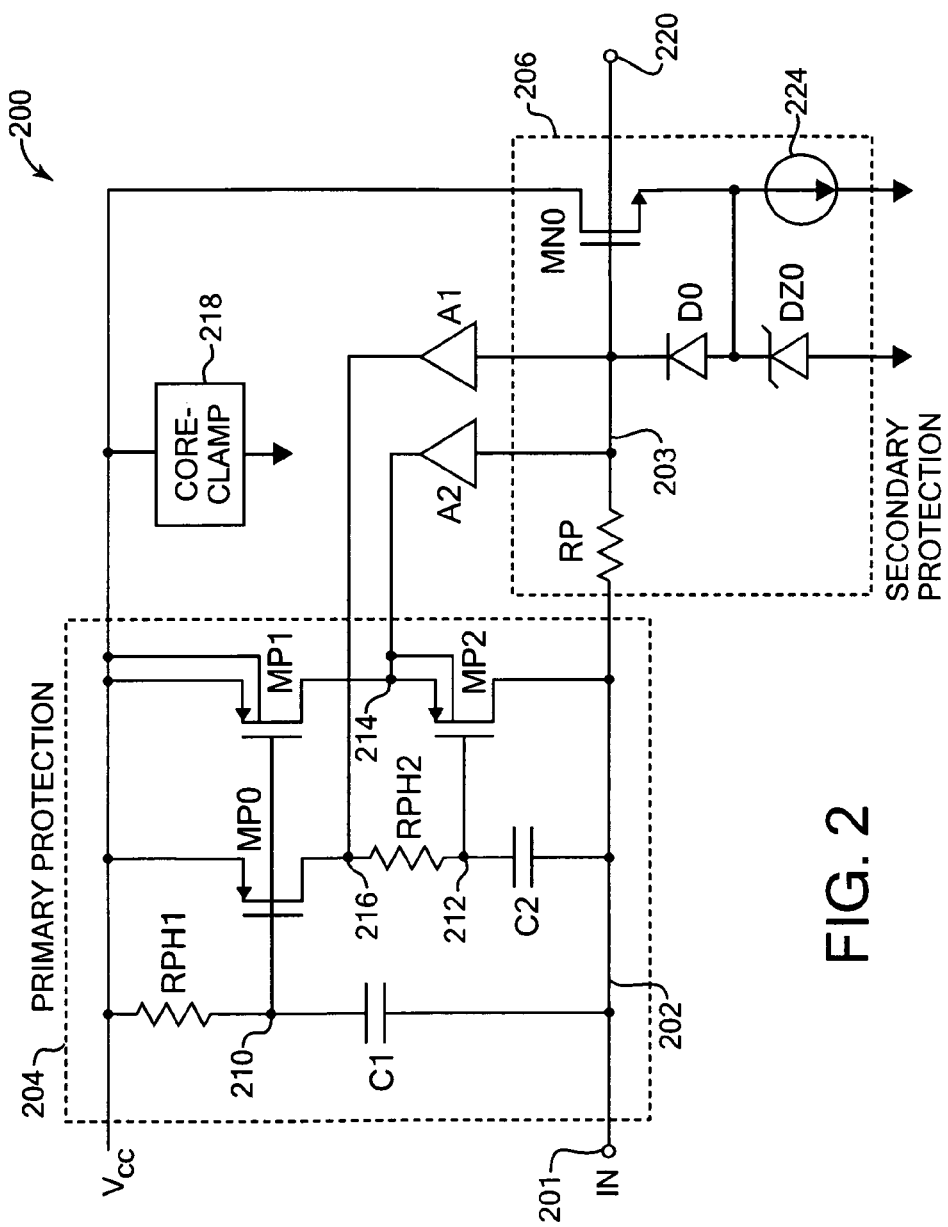
FIG. 2 is a schematic diagram of another implementation of an example ESD protection circuit suitable for use with one or more features and implementations described herein.

FIG. 2 is a schematic diagram illustrating another implementation 200 of the ESD protection circuit 100 shown in FIG. 1. The ESD protection circuit 200 includes several similar components to the circuit 100 of FIG. 1.

ESD protection circuit 200 includes an input terminal 201 at an input line 202 connected to a primary protection block 204, that includes P-channel transistors MP2 and MP1 connected in series between Vcc and the input line 202 similarly as transistors P1 and P2 in protection circuit 100 of FIG 1. For example, transistors MP2 and MP1 can be PMOS transistors having the body connections of their body diodes connected to the sources of their respective devices as shown. The gate of transistor MP2 is connected to a node 212 and the gale of transistor MP1 is connected to a node 210. Capacitor C1 is connected between the input line 202 and the node 210, and the resistor RPH1 is connected between the node 210 and the Vcc upper supply rail. A core-clamp 218 is connected between Vcc and ground. Secondary protection block 206 includes resistor RP, diodes D0 and DZ0, transistor MN0, and current source 224 which have similar connections and functions as described above for secondary protection block 104 of FIG. 1, and is connected to a terminal 220 that is connected to the protected circuit. Follower amplifiers A1 and A2 have inputs connected to the node 203 of the input line 202. where amplifier A1 is connected to the node 216. and amplifier A2 is connected to a node 214 between transistors MP1 and MP2.

The primary protection block 204 includes an additional transistor MP0. A capacitor C2 has a first terminal connected to the input line 202 and a second terminal connected to node 212. The resistor RPH2 has a first terminal connected to node 212 and a second terminal connected to node 216. Transistor MP0 has drain connected to node 216 and has a gate coupled to node 210 between the capacitor C1 and resistor RPH1. Transistor MP0 also has a source coupled to the upper supply rail.

In some implementations, the transistor MP0 can allow control over the voltage on the gate of transistor MP2 when needed. Using transistor MP0, the protection circuit 100 can set the gate voltage of the transistor MP2 to a value of about double the Fermi voltage level of the transistor MP2 during normal operation when no ESD strike is present, which reduces the leakage current of transistor MP2 as described above. The transistor MP0 also allows current to flow through the node 216 for an ESD strike.

For example, during normal operation, transistor MP0 is off because resistor RPH1 has no current and the gate of MP0 is connected to that transistor. Thus, the A2 amplifier will provide the voltage for the gate of transistor MP2 since transistor MP0 is off and the capacitor C2 is an open circuit. For a negative ESD strike, the gates of transistors MP0 and MP1 are pulled down to turn on these transistors and transistor MP0 will conduct and act as a short to Vcc. This causes the node 216 to he at the Vcc voltage, as if the resistor RPH2 were connected to Vcc similarly to resistor RPH1. For a positive strike, the positive edge of strike will pull up the gates of the transistors MP0, MP1, and MP2, turning these transistors off such that no current conducts through MP0. Thus, the transistor MP0 allows the A2 amplifier to control the gate voltage of the transistor MP2 during normal operation to reduce leakage current, and not during an ESD strike.

The protection circuit features described herein can be used in various applications. As described above, the described features can he used to provide a protection circuit having a low leakage current and a low current noise. The primary protection block can provide one path for positive and negative ESD strikes, and with one path and one acting diode connected to the input, there is less leakage current and therefore less current noise. Furthermore, the secondary protection block provides low leakage current and low current noise because it uses very low currents and has smaller-sized components such as diode D0.

In some applications, a low leakage current may be more important than having low current noise. Various implementations of described circuit features can accommodate these types of applications. For example, in some implementations, the secondary protection block 106 can be designed to provide an increased amount of leakage current than the implementations shown in FIGS. 1 and 2, such that the secondary block provides the same amount, or close to the same amount, of leakage current as the primary protection block 104. With the leakage currents from the primary and secondary blocks flowing in opposite directions, these currents would at least partially cancel each other and would cause the total leakage current to be reduced. In some implementations, for example, the leakage current of the secondary protection block 106 can be increased to be similar to the leakage current of the primary block 104 by increasing the size of the diode D0 in the circuits of FIGS. 1 and 2.

A variety of other implementations can use the features described herein. For example, some implementations can use one or more N-channel devices instead of one or more of the P-channel devices described in the primary protection block 104 or 204. Other components can be substituted for the described components in some implementations. Some implementations can use one or more portions of the protection circuits 100 and 200 described above without other portions.

Although various implementations have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other implementations may be interchanged either in whole or in part. It is therefore intended that the claims be interpreted in accordance with the true spirit and scope of the inventions without limitation or estoppel.

What is claimed is:

1. An electrostatic discharge (ESD) protection circuit comprising:
    an input operative to receive input signals; and
    a primary protection circuit coupled to the input, wherein the protection circuit is operative to provide a single ESD current path for one or more the input signals that are ESD strikes, wherein the primary protection circuit includes at least one transistor on the single ESD current path, wherein the primary protection circuit produces a leakage current at the input and uses at least one bootstrapping amplifier to provide a reduced voltage across the transistor and to reduce input current dependency of the leakage current on an input voltage at the input, wherein the currents of positive ESD strikes and negative ESD strikes flow through the single ESD current path, and wherein the single ESD current path is not used by one or more of the input signals that are non-ESD signals.

2. An electrostatic discharge (ESD) protection circuit comprising:
    an input operative to receive input signals; and
    a primary protection circuit coupled to the input, wherein the protection circuit is operative to provide a single ESD current path for one or more the input signals that are ESD strikes, wherein the primary protection circuit includes at least one transistor on the single ESD current path, wherein the gate of the transistor is biased above a voltage at a source or a drain of the transistor by a voltage about double the semiconductor Fermi voltage level of the transistor to reduce the leakage current of the transistor, wherein the currents of positive ESD strikes and negative ESD strikes flow through the single ESD current path, and wherein the single ESD current path is not used by one or more of the input signals that are non-ESD signals.

3. The ESD protection circuit of claim 2 wherein the at least one transistor is used as a body diode if the ESD strike is a positive strike and turned on as a conducting transistor if the ESD strike is a negative strike.

4. The ESD protection circuit of claim 1 wherein the single ESD current path includes a plurality of transistors included in the primary protection circuit, and wherein the transistors act as diodes for the ESD strikes having one or more positive voltages and turned on as a conducting transistor for the ESD strikes having one or more negative voltages.

5. The ESD protection circuit of claim 1 wherein the primary protection circuit is coupled to an upper supply rail, and wherein the primary protection circuit includes a core-clamp coupled to the upper supply rail and operative to limit the voltage of the ESD strikes that have one or more positive voltages.

6. The ESD protection circuit of claim 1 wherein the primary protection circuit is coupled to an upper supply rail, and further comprising a secondary protection circuit coupled to the primary protection circuit, coupled to the input, and coupled to a lower supply rail, wherein the secondary protection circuit is operative to provide a second ESD current path for the input ESD strikes having one or more negative voltages.

7. The ESD protection circuit of claim 6 wherein a leakage current of the secondary protection circuit is less than a leakage current of the primary protection circuit.

8. The ESD protection circuit of claim 6 wherein the secondary protection circuit is coupled to the primary protection circuit by a resistor, and wherein the secondary protection circuit includes at least one diode on the second ESD current path.

9. The ESD protection circuit of claim 2 wherein the gate of the at least one transistor of the primary protection circuit is capacitively coupled to the input.

10. The ESD protection circuit of claim 2 wherein the at least one transistor is a MOSFET transistor.

11. An electrostatic discharge (ESD) protection circuit comprising:
    an input operative to receive input signals; and
    a transistor coupled to the input, the transistor operative to provide an ESD current path for the received input signals that are ESD strikes, wherein a gate of the transistor is biased above a voltage at a source or a drain of the transistor by a voltage about double the semiconductor Fermi voltage level of the transistor.

12. The ESD protection circuit of claim 11 wherein the transistor is a first transistor, and further comprising a second transistor included in the ESD current path and coupled between the first transistor and an upper supply rail.

13. The ESD protection circuit of claim 12 wherein the gates of the first transistor and the second transistor are capacitively coupled to the input.

14. The ESD protection circuit of claim 12 further comprising a core-clamp coupled to the upper supply rail, wherein the first and second transistors and the core-clamp are included in the ESD current path, and
    wherein currents of the ESD strikes flow through the ESD current path for the ESD strikes that have one or more positive voltages and for the ESD strikes that have one or more negative voltages, and wherein the single ESD current path is not used by the input signals that are non-ESD signals.

15. The ESD protection circuit of claim 11 wherein the transistor is included in a primary protection circuit, and further comprising a secondary protection circuit coupled to the primary protection circuit, coupled to the input, and coupled to a lower supply rail, wherein the secondary protection circuit includes at least a zener diode and is operative to provide a second ESD current path for the ESD strikes that have one or more negative voltages, and wherein a leakage current of the secondary protection circuit is less than leakage current of the primary protection circuit.

16. The ESD protection circuit of claim 11 further comprising:
    a first amplifier connected between the input and a source of the transistor and providing a voltage to the source about equal to an input voltage of the input; and
    a second amplifier connected between the input and a gate of the transistor and providing a voltage to the gate above the input voltage by an amount about double the semiconductor Fermi voltage level of the transistor.

17. An electrostatic discharge (ESD) protection circuit comprising:
    an input operative to receive input signals;
    a core-clamp connected to an upper supply rail;

a primary protection circuit coupled to the input, wherein the primary protection circuit is operative to provide a first ESD current path for one or more of the input signals that are ESD strikes, wherein the first ESD current path includes:
   a first transistor capacitively coupled to the input,
   a second transistor capacitively coupled to the input and connected between the first transistor and the upper supply rail, and the core-clamp,
wherein the currents of the ESD strikes flow through the first ESD current path for the ESD strikes that have one or more positive voltages and for the ESD strikes that have one or more negative voltages, and wherein the first ESD current path is not used by one or more of the input signals that are non-ESD signals; and
a secondary protection circuit coupled to the primary protection circuit, coupled to the input, and coupled to a lower supply rail, wherein the secondary protection circuit is operative to provide a second ESD current path for the input ESD strikes having one or more negative voltages.

18. The ESD protection circuit of claim 17 wherein the first transistor is a P-channel MOSFET including:
   a source that is bootstrapped to a voltage about equal to a voltage of the input, and
   a gate that is bootstrapped to a voltage that is above the voltage of the input by an amount about double the semiconductor Fermi voltage level of the first transistor.

19. The ESD protection circuit of claim 2 wherein the primary protection circuit is coupled to an upper supply rail, and further comprising a secondary protection circuit coupled to the primary protection circuit, coupled to the input, and coupled to a lower supply rail, wherein the secondary protection circuit is operative to provide a second ESD current path for the input ESD strikes having one or more negative voltages.

20. The ESD protection circuit of claim 19 wherein a leakage current of the secondary protection circuit is less than a leakage current of the primary protection circuit.

* * * * *